Figure 1:
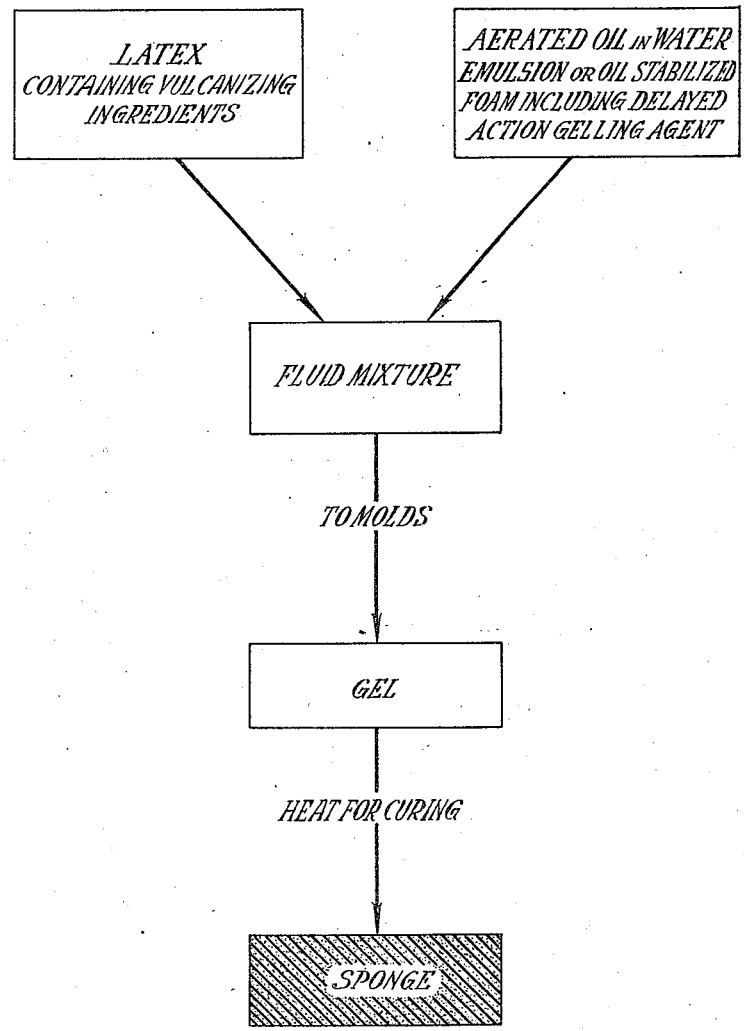

Nov. 4, 1941.          J. H. KELLY, JR          2,261,439
PREPARATION OF CELLULAR COMPOSITIONS OF RUBBER OR RUBBERLIKE SUBSTANCES
Filed May 1, 1939          2 Sheets-Sheet 2

INVENTOR.
John H. Kelly, Jr.
BY
Zabel, Carlson, Gritzbaugh & Wells
ATTORNEYS.

Patented Nov. 4, 1941

2,261,439

UNITED STATES PATENT OFFICE 2,261,439

PREPARATION OF CELLULAR COMPOSITIONS OF RUBBER OR RUBBERLIKE SUBSTANCES

John H. Kelly, Jr., Chicago, Ill., assignor to Dryden Rubber Company, Chicago, Ill., a corporation of Illinois Application May 1, 1939, Serial No. 271,056

29 Claims. (Cl. 260—723)

This application is a continuation in part of my co-pending application Serial Number 155,440, filed July 24, 1937, entitled "Cellular rubber or rubber-like compositions and method of producing the same."

The invention relates to the preparation of cellular products and more particularly to a new and improved process of producing cellular compositions of rubber or rubber-like substances from processed or compounded aqueous natural or synthetic latices or dispersions of rubber, reclaimed rubber, rubber-like alkaline polysulfide reaction products known as Thiokol, rubber-like polymerized chloroprene known as Neoprene, rubber-like polyvinyl derivatives and the like.

The invention is further characterized as being an improvement on those processes of producing cellular rubber in which the rubber latex is intermixed with a separately prepared froth or liquid foam. Hitherto processes of producing cellular rubber by intermixing latex with a separately prepared foam have involved the use of a foam made by whipping or beating air into an aqueous glue solution or some other aqueous liquid containing a water soluble foaming agent such as, for example, an alkali or ammonia soap or, saponin.

In accordance with the present invention, latex or a like dispersion is intermixed with a liquid foam stabilized at least in part with a water insoluble foam stabilizer. By the use of a water insoluble foam stabilizer, there is less chance for detrimental interfacial reactions. Moreover, the effect of the water insoluble foam stabilizer is more readily controllable as it is directly proportional to the amount present for a given surface area.

In one embodiment of the invention, the water insoluble foam stabilizer consists essentially of droplets of oil in the water-air interface. The foam so stabilized is referred to herein as an oil stabilized foam and sometimes as a gasified or aerated oil in water emulsion. When latex is intermixed with such foam, gelled, and the gel heated, the oil will slowly and uniformly disperse into the rubber constituting the cellular walls of the sponge. Oil may thus be incorporated with the rubber in quite large quantities if so desired and an extremely soft cellular or sponge rubber product may be obtained. Although oil has been incorporated in some sponge or cellular rubber products by other means, so far as we know, the other methods will not allow the incorporation of the oil in such large quantities and the cellular or sponge rubber product obtained has not been so soft and uniform as the sponge or cellular products obtained by the processes of the present invention.

Another advantage of the present invention is that it provides a practical process of producing cellular rubber products of extremely low density.

Another advantage is that the process may be adapted to produce a product having a structure in which the cells are interconnected and are of any predetermined desired size.

A further advantage of the process of this invention is that it provides a means for producing cellular rubber compositions in which the period of gelation of the aqueous rubber dispersion used in the process may be controlled and made sufficiently long for carrying out mixing and transferring operations in an easy and simple manner.

Figure 2:
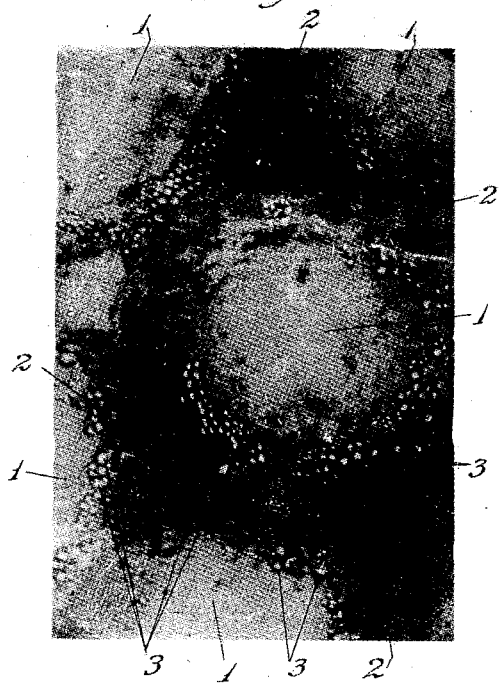
Figure 3:
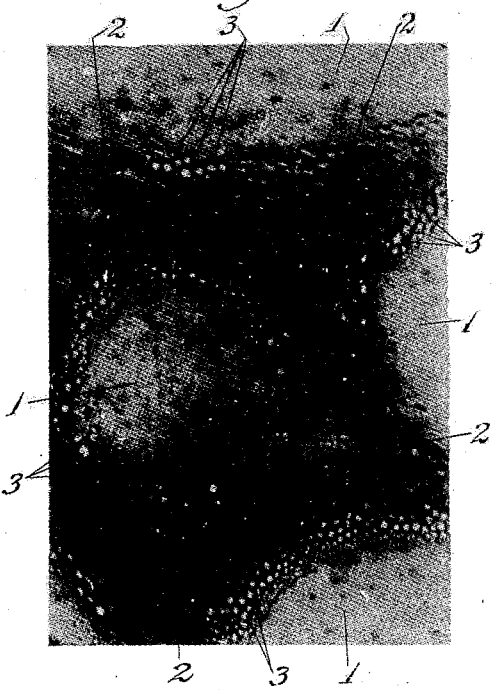
Figure 4:
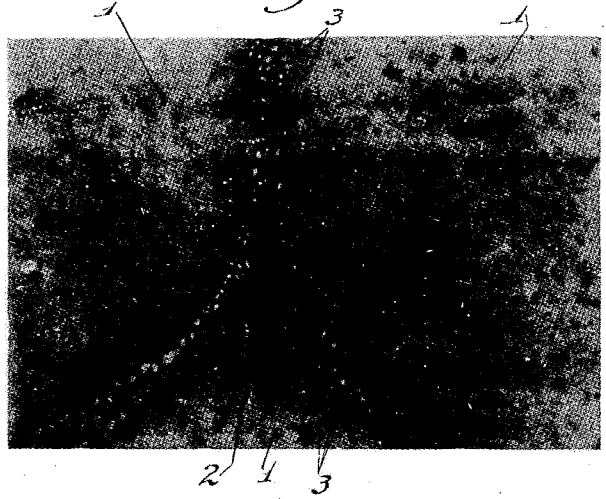

Other objects and advantages of the invention will become apparent as the following detailed description progresses, reference being had to the accompanying drawings, in which Fig. 1 is a diagrammatic flow sheet of the preferred process of this invention;

Figs. 2, 3 and 4 are microphotographs of oil stabilized foams used in the practice of this invention.

Referring to the drawings, in which the preferred embodiment of the invention is illustrated, latex containing vulcanized ingredients is intermixed with an oil stabilized foam containing an agent which will cause the latex to gel, preferably after a period of time or through the action of heat. The fluid mixture so obtained is poured into a mold and allowed to set to a gel, producing what may be termed a formed solid foam. This gel or solid foam is then preferably subjected to heat in order to vulcanize it whereby the cellular or sponge product as shown in Fig. 1 is obtained.

In the preferred embodiment of the invention, a dispersion is made comprising a water insoluble liquid such as oil, water, and an emulsifying agent for the oil in water such as gelatin; a tanning agent for the gelatin, a surface tension reducer of the wetting agent type such as Aquarex D (the one-half sodium sulfate ester of a mixture of higher alcohols), and a gelling agent for the latex such as sodium silico fluoride, triethanolamine acetate or the like. This dispersion is whipped into a heavy foam and into this foam the latex compound is slowly added in a thin stream while the mixing is continued at slow speed. The mixture is then poured into molds, allowed to gel, and vulcanized in the usual manner.

It is seen from the above that the foam and the preparation of the foam into which the latex or like dispersion is mixed is an essential feature of this invention.

Referring to Figs. 2, 3 and 4, in which a preferred type of oil stabilized foam for use in the practice of this invention is shown, the reference character 1 indicates bubbles of air surrounded by water 2 and having droplets of oil 3 distributed in the water-air interface. In the microphotographs the high concentration of oil droplets in the interfacial layers is clearly visible and indicates that the droplets of oil render the foam highly stable by forming a cylinder of droplets around the air bubbles. When latex is poured into this oil stabilized foam, it readily mixes with the water of the interface but is kept from collapsing the air bubbles by the surrounding protective layers of oil droplets. It is apparent from the microphotographs that while the foams used in the practice of this invention may broadly be called gasified or aerated oil in water type emulsions, they also may be more specifically called oil stabilized foams.

The theory as to the mechanism of the gelation of the latex by certain of the oil stabilized foams described in this specification has been a subject of controversy, and I do not intend to limit myself to any theory. In general although perhaps not always, gelation of latex is effected by neutralizing the electrical charge on the rubber particles of the latex. In normal alkaline latex, the rubber particles have a negative charge probably due to an adsorbed layer of protein substance which in an alkaline solution necessarily would have a negative charge. It is thus apparent that if the electrical charge of the oil stabilized foam is positive or the foam contains ionic material reacting to adversely affect negatively charged matter, the charge on the rubber particles of the latex will be neutralized and coagulation or gelation result.

In the practice of this invention, the electrical charge for producing neutralization of the charge on the rubber particles of the latex and thus gelation of the latex may be produced in the foam in various ways. Generally the charge is produced by incorporating in the oil in water emulsion or by producing in situ in the oil in water emulsion a substance which ionizes to produce a charge which will neutralize the charge on the latex. When we are dealing with alkaline latex such as ammonia preserved latex which ordinarily gives a negative charge, it is essential that the effective charge of the oil in water emulsion in contact with the latex be positive. This effective positive charge may be said to be derived from a positively charged emulsion as such or else from negatively charged oil in water emulsions carrying ionic material incapable of disturbing the equilibria of the emulsion, but profoundly affecting the latex system. However, in acid latex the particles according to literature are positively charged, and for this and other types of latex which carry a positive charge, the effective electrical charge in the oil in water emulsion should be negative. It is not only important, however, that the charge on the latex particles be neutralized, but the neutralization should be carried out slowly or at least in such a manner that slow coagulation or gelation results. Preferably the gelation should take place only after a period of time or after the mixture of foam and latex has been poured into molds. In order to accomplish this, it is necessary that the procedure set forth in the various examples be carried out carefully as variations in proportions of ingredients one way or the other may result in too slow or too quick gelation, or even failure of gelation. This is particularly true where gelatin or casein are used as emulsifying agents for the oil in water emulsion. Since gelatin is an amphoteric colloid, it may carry upon its surface a charge of positive or negative character, depending upon the iso-electric point of the particular gelatin involved. Therefore, in order to regulate the effect of the gelatin on the coagulation of the latex, it is necessary that the pH value of the gelatin be regulated. Also it is preferred that the gelatin be reacted with a tanning agent in order to reduce its protective colloid action and also render it insoluble, the insoluble type gelatin having some advantages. Furthermore, with the aerated oil in water type emulsions in which gelatin is used as an emulsifying agent for the oil, various salts or other compounds which ionize so as to give a suitable charge may be incorporated in the oil in water emulsion or produced in the oil in water emulsion by reaction.

As emulsifying agents for preparing the foam, there is contemplated any substance which stabilizes the oil in water type emulsion and also which preferably directly or indirectly stabilizes the foam. Material suitable for the preparation of the desired emulsions can be classified into groups as follows:

1. The first group consists of those agents susceptible of having their properties chemically and electrically modified such as glue, gelatin, casein, etc. Gelatin, which may be taken as representative of this group, is assumed to be an amphoteric colloid which may carry upon its surface an electric charge of positive or negative character, depending upon the iso-electric point of the particular gelatin involved.

Gelatins derived from limed precursors are generally assumed to have an iso-electric point of pH 4.7, whereas those produced by acid hydrolysis from non-limed precursors are believed to have an iso-electric region of pH 7.5 to 8.0. At a pH greater than its iso-electric point gelatin is stated to be negatively charged. At a pH below its iso-electric point the gelatin is assumed to be positively charged. The charge in either case is believed to assume either positive or negative character depending upon the hydrogen ion concentration of the system.

It follows from the foregoing that the charge upon the gelatin in the froth used in the process will carry its initial charge unless the same has been reversed by electrolytes or other components of the froth which have modified the pH of the system with reference to the iso-electric point of the gelatin.

Gelatin may also be chemically modified. It may be hydrolized or can be subjected to a tanning agent with the -ic and -ous compounds of the iron group of the periodic scale, and alternately the halogen salts of these elements also function fairly well. Formaldehyde can also be used to tan and render insoluble the gelatin.

When casein is used, the sodium or calcium caseinates are preferred, although any alkaline earth or heavy metal caseinates can be used.

2. The second group of emulsifying agents consists of the soaps, including the anionic soaps and the cationic soaps.

Ordinary soap substances are compounds containing a long hydrocarbon chain with a hydrophilic "head." In water, the positive ion of these substances is, as a general rule, a metal; the negative or anion contains the long hydrocarbon chain. These soaps are termed "anionic," since the part of the molecule which gives the surface-active or soap-like properties is the anion, and in order to distinguish them from the recently commercially available soaps of the "cationic" type. The usual sodium and potassium salts of palmitic, stearic, and oleic acids, etc., are anionic soaps as are also the majority of the newer detergents, such as the "Igepons," "Lissapols," etc. The "cationic" soaps are the converse; in this case, the long chain is on the positive ion, the negative ion being a halide, sulphate, or other simple anionic group. Generally speaking, in the "cationic" soaps the hydrophilic head, to which the long chain is attached, is the positive quaternary ammonium, sulphonium, or phosphonium group; cetyl pyridinium bromide and dodecyl trimethyl ammonium bromide, lauryl trimethyl ammonium bromide and stearyl trimethyl ammonium bromide are typical "cationic" soaps.

Aerated oil in water emulsions can be made, using the soaps as emulsifying agents. In this oil in water emulsion, the electrical charge carried by the oil particles depends upon the type of soap used, being positive for cationic and negative for anionic soap. The sign of the charge on the oil particles is independent of the pH although the magnitude of the charge is dependent upon the pH to some extent. The effective charge of the foam, however, is influenced by the pH. In preparing aerated oil in water emulsions which will cause gelation of latex, it is necessary not only to consider the electrical charge on the oil particles of the aerated oil in water emulsions but the charge in the water phase. However, under proper conditions such as set forth in the examples in which cationic soaps are used as emulsifying agents for the oil in water emulsions, the cationic soap may itself act as the main gelling agent for latex intermixed with the oil in water emulsions.

3. The third group of emulsifying agents consists of those agents which are heat reactive such as blood, egg or bean albumen.

4. The fourth group of emulsifying agents comprises those materials which in practical processes can be stated to be comparatively nonreactive even though peptized or hydrolized, and include such varied material as colloidal polysaccharose, glucose, vegetable gums and resins such as gum karaya, gum tragacanth and locust bean or carob gum.

5. The fifth group of emulsifying agents consists of water insoluble solid material such as bentonite and gasblack.

From the above it is apparent that emulsifying agents as a group are operative in the practice of this invention. When an oil in water type emulsion is used as a foam stabilizer present in the air-water interface, the emulsifying agent should be a substance which stabilizes the oil in water type emulsion.

The preferred emulsifying agents are certain classes of gelatin, such as "gelatin chloride," "calcium gelatinate" or mixtures of these. These gelatins are either derived from hydrochloric acid hydrolysis or else from the alkali hydrolysis of limed collagenous matter. Since high grade gelatins of these types are substantially low in, or practically free from, excess peptone content, it is comparatively easy when using these materials, to form reactions in situ on the gelatin during the frothing operations. As a general rule, the gelatins may be treated with protein precipitants or tanning agents such as ferrous sulfate, chrome alum, or other tanning agents. In other modifications, the gelatins may be subject to treatment with other -ic and -ous compounds of the iron group of the periodic scale.

In those examples wherein the gelatin is not previously treated with sulfates or tanning agents, it may be subjected to reaction with ammonium carbonate or other compounds in the presence of synthetic foaming or wetting agents. In these cases, the modified gelatin, when suitably frothed in an oil in water emulsion, can bear on its film forming membranes appreciable and heavy quantities of zinc oxide, calcium sulfate, bentonite, gasblack or other solids acting as film reenforcing agents. Frothed emulsions of this type are usually extremely stiff and rigid if properly balanced and aerated to sufficient extent.

If an amphoteric colloid is not desired as an emulsifying agent, it will be found that the use of other materials may advantageously be utilized; for instance, if locust bean gum, a colloidal polysaccharose is used in place of gelatin, the use of such material as diphenylguanidine or other materials which react adversely on the gelatine emulsions are utilizable. It is obvious that the use of such materials as albumen, caseinates, licorice root and many other ingredients can also be utilized as either the emulsifying agent or as one of the components of the emulsion.

The foam stabilizer contemplated in this invention is preferably a water insoluble material of extremely fine or colloidal dimensions which may or may not be an emulsifying agent. The preferred foam stabilizer is shown in Figs. 2, 3 and 4, and consists of droplets of oil in the air-water interface. The droplets of oil are stabilized and apparently separated from the water by the emulsifying agent such as, for example, the gelatin. The droplets of oil surrounded by water constitute the oil in water emulsion. It is apparent that other water insoluble liquids may be used in place of mineral oil such as, for example, vegetable and fish oils, fatty acids, aromatic hydrocarbons, and water insoluble alcohols and ethers. The term oil in water type emulsion is used in this specification and is commonly used to describe an emulsion in which such water insoluble liquids are the disperse phase.

In the preparation of foams for intermixing with latex, it is preferred to use a surface tension reducing agent, preferably one of the synthetic wetting agents. It may be stated that the production of the foam is aided by the presence of surface tension reducers and the very high stability of the foams used in this invention is obtained by the combination of tanned gelatin, polar orientation of the wetting agent molecules, and the oil present in emulsified and oriented form. The wetting agent which it is preferred to use in order to facilitate the production of the froth or foam is known to the trade as Aquarex D which is the one half sodium sulphate ester of lauryl and myristyl alcohols. Other wetting agents which are extremely beneficial in the emulsified oil and water froths include sodium methylene naphthalene sulfonate, sodium isopropyl naphthalene sulfonate and the sodium and sodium sulfonate salts of aromatic dicarboxylic acids are extremely beneficial in the emulsified oil in water froths. In some instances, the use of sodium oleate, ammonium oleate and ammonium linoleate are also useful.

In many of the examples given for the production of foams or froths which include gelling agents (coagulating ions which cause gelation of latex), there is included certain alkaline substances such as ammonium hydroxide, ammonium carbonate, and sodium hydroxide. Primarily the purpose of these materials, in addition to acting as reactants with alkaline silico fluorides or with hydrofluosilico acid is to create a hydroxyl ion concentration higher than originally existing in the froth. In other words, there is a buffer reaction.

In carrying out this invention, it is contemplated that the aqueous dispersion generally used will be dispersions of rubber-like materials, including processed or compounded aqueous material or synthetic latices or dispersions of rubber, reclaimed rubber, alkaline polysulphide reaction products known as "Thiokol," rubber-like polymerized chloroprene known as "Neoprene" and the aqueous polymerization or dispersion products of such materials as butadiene or vinyl derivatives.

In preparing a positively charged emulsion, a suitable protein emulsifier, such as gelatin of high purity and gel-strength may be dissolved in water. An alcohol, either mono-, di-, or trihydric is added and blended. Next an alkaloidal reagent or protein precipitant such as ferrous sulphate may be added in an aqueous vehicle and stirring gently initiated, maintaining meanwhile a temperature of 55 degrees to 60 degrees C. After a few minutes a small amount of soap plus an excess of alkali, say 4%, on the emulsifying agent, may be added and stirring continued. The addition of the alkali in the presence of ferrous sulphate gives a reaction similar to the Biuret reaction and an intense blue-green coloration exists, partially ensuing from the oxidizing of the ferrous ions to the ferric state and partially due to the formation of complex protein and organo-metallic ions. Lastly the addition of a suitable salt such as sodium or potassium silico fluorid may be made and the intense blue-green coloration of the mixture gradually lightens. Thereafter, suitable amounts of a mineral oil, such as "Opalube" or "Atlantic red" may be added and the stirring vigorously increased in intensity while at the same time the mass should be gradually cooled. The oil may be added in quantities up to 300% of the emulsifier and if desired suitable fillers or pigments for the latex also may be incorporated. The resulting oil in water emulsion increases 300 to 500% in volume and exists as a firm mobile mass, having comparatively little surface tension.

Alternatively one can take a stable acid latex, created by the addition of saponin or casein to latex, followed by the addition of a suitable acid, and add such latex to a negatively charged emulsion prepared in any suitable manner. In some instances, the emulsifier for the oil in water emulsion can be a suitable water soluble acidic vegetable gum. It is of course, understood that the hydrogen ion values are to be correctly adjusted.

As a general rule alcohols, glycerols or glycols are added to positively charged emulsions. Alcohols, acting as a precipitant of proteins, particularly when existing in the monohydric modification, enhances the coagulating activity of the divalent and trivalent salts existing as suspensoid precipitates in the emulsions. The character of the salts formed governs the types of flocculated material formed. Weak precipitants of protein and latex act differently from energetic or overly active precipitants.

In a properly balanced negatively charged latex dispersion—positively charged emulsion mixture, the flocculated material, although retaining free-flowing liquidity when freshly blended and mixed, nevertheless coagulates eventually into thread-like filaments of unflocculated rubber connecting the larger groups or units of agglomerated or flocculated rubber to each other and eventually forms a network of interconnecting cells surrounded by wall or cell structure of uneven film thickness.

The procedure constituting one embodiment of the process of this invention, is productive of cellular structures which reveal, as may be surmised, under the microscope heavily walled cells of noticeable variance in thickness. Latex products of this type produced by older methods are usually identifiable by a spidery network of interconnecting cells.

In producing the finished cellular articles, the blended mixture of oppositely charged materials is poured into suitable molds, vulcanized either in hot ovens or in water 1 to 2 hours at 95 degrees C. to 100 degrees C. after gelation and coagulation and finally washed and dried.

A typical oil in water emulsion, positively charged to the negatively charged latex is as follows:

| | Parts by weight |
|---|---|
| Gelatin (U-Cop Co. 4X) | 65.00 |
| Alcohol (glycerol) | 10.00 |
| Ferrous sulphate | 5.00 |
| 50° Baumé caustic soda | 8.00 |
| Oleic acid | 5.00 |
| Sodium silico fluoride | 10.00 |
| Petroleum oil | 100.00 |
| Water | 797.00 |
| | 1,000.00 |

The gelatin, which is the emulsifying agent, previously dissolved in 97.5 parts of water is further diluted with 370 parts of warm water, 80 degrees C., and the mixture placed in a vessel equipped with a steam jacket and a whipping mechanism, of variable speed, similar to an egg beater. Ten parts of alcohol in 10 parts of water are slowly added and the whipping mechanism slowly turned to blend the mixture after which five parts of a protein precipitant such as ferrous sulphate is added. The mixture is gently stirred and the temperature maintained at 55 degrees to 60 degrees C. by circulating hot water in the jacket. At the end of 5 minutes the caustic soda and the oleic acid are added in the form of flocculated sodium oleate-excess alkali, diluted in 200 parts of hot water, followed by the addition of sodium silico fluoride in the balance of the water. After stirring for 5 to 10 minutes the dark blue-green coloration caused by the addition of the alkali and fluorid salt lightens to a clear brown shade and the oil slowly poured into the mixture while violently agitating the mixture through high speed whipping. Cold water now circulating in the jacket cools the agitated material and 30 minutes after starting a highly aerated mobile and free flowing oil in water emulsion is produced. The product containing 20% solids, equals in volume 3,500 parts of water. Other modifications containing up to 35 or 40% solids may be produced and if a volatile solvent such as gasoline or equivalent solvent is selected as the oil in water phase, up to 60% non-aqueous contents can be produced if the formula is slightly modified.

This emulsion may be poured out and weighed, if necessary, and 1580 parts by weight of a mixture comprising 1420 parts of a concentrated latex possessing 70% solid contents and having 2½% soap and 1% stabilizer, is mixed with 160 parts of a casein stabilized mixture of 10 parts of sulphur, 30 parts of zinc oxide, and 10 parts of an accelerator such as butyl zimate, and an antioxidant such as agerite white, are slowly added to the emulsion. The mixture thickens and is poured into suitable molds and gels within 25 minutes and is then either cured in heated air or in boiling water.

This invention also contemplates that a positively charged latex or latex-like dispersion may be used with a negatively charged oil in water emulsion. The dispersion may or may not have its suspended particles positively charged, in other words cathode depositing, but whether cathode depositing or not, one of the constituents of the dispersion must be oppositely charged or electrolytically antagonistic to the negatively charged oil in water emulsion. This condition of obtaining a positive charged dispersion is obtained by using reagents acting as colloidal electrolytes, such as certain acids, bases or salts. It may also be obtained by the mutual reaction between two oppositely charged colloids. In the latter instance such colloids are those usually functioning as amphoteric electrolytes, forming salts such as protein chloride or sodium proteinates.

Alkalinity of the latex or latex-like body is removed or neutralized as a general rule when preparing positively charge dispersions. Since the hydrogen ion concentration is of major importance and should be controlled in order to eliminate formation of salts giving rise to undesirable ionizing tendencies, a pH value of 7 or in the vicinity of 7 is desirable before attempting a charge reversal of the latex or before the incorporation of material in the latex which is oppositely charged to the oil in water emulsion.

As an example of a latex treated to possess positively charged material (not positively charged cathode-travelling particles), but oppositely charged to a component of a negatively charged oil in water type emulsion, 1,420 parts of a standard grade of evaporated latex, such as the commercial product "Revertex" containing 70 per cent solids and preserved with a small amount of soap-like colloid and non-volatile alkali, may be treated with 0.8 per cent boric acid. The acid either in saturated solution or as the dry product may be added while stirring the latex. When the desired neutralization is reached the latex is diluted to reduce the solid content to 65% by the addition of neutralized water. Fifteen hundred and thirty (1530) parts of this treated latex is blended or admixed with an aqueous paste obtained by ball-milling 10 parts zinc oxide, 10 parts sulphur, 10 parts of a vulcanizing accelerator such as butyl or ethyl zimate, 1.2 parts of a dispersing agent such as Darvan, 1.2 parts of casein, 1 part of caustic soda and 26.6 parts of water.

Separately an oil in water emulsion should be made consisting of 3.13 parts of locust bean gum, 3.13 parts of a soap-like stabilizer such as the ½ sodium sulphate ester of a mixture of higher alcohols known as "Aquarex D", 3.13 parts of a gelling agent such as sodium silico fluoride or electrically equivalent parts of sodium fluoride, or any suitable salt, 95.6 parts of light mineral oil and 639.9 parts of water. This emulsion, when vigorously agitated in suitable apparatus, increases in volume approximately 375 to 400%.

The latex mixture may next be poured slowly into this highly aerated oil in water emulsion and causes a slight thickening action, and when the whole is poured into suitable molds the mixture gels in a short time and may then be vulcanized. The resultant product is a very soft velvety sponge having an extremely small open or connected cellular structure.

In the above example the boric acid complex behaving as the positive electrolyte reacts with the locust bean gum constituent of the emulsion. This gum, while not strictly a protein colloid, as it belongs to a class identified as colloidal polysaccharose, nevertheless performs the type of reactions described. This reaction involves two separate reactions. The boric salt acts as a positively charged electrolyte on the colloid with the result that thickening ensues and excessive fall in viscosity is eliminated. After the first reaction is complete, the negatively charged particles of the latex dispersion are slowly gelled by the coagulating material in the emulsion. Any coagulating material in the emulsion can be used provided it does not disturb the charge in the emulsion.

Positively charged latex, having cathode-traveling particles, is made in a manner to avoid ionizing complexes being formed from ammonia, and after mixing with suitable accelerators is blended with similar oil in water emulsions. Similarly one may use positively charged Neoprene latices, acid dispersions of synthetic rubber-like polymers, or vice versa, the negatively charged dispersions of the same material. The olefine-dihalide polysulfide dispersions are also adapted to the reaction principle involved. Alternatively, one may take a negatively charged latex dispersion, incorporate oil and emulsifying agents, gelling agents, etc., and form an aerated oil in water emulsion for blending with synthetic positively charged rubber-like latices. In general, those colloids which act oppositely on others are usually selected for this type of reaction.

This invention therefore produces cellular or sponge-like rubber by the admixture of two sols or emulsions, or of an emulsion and an aqueous dispersion or suspensoid, one of which is positively charged to the negative charge of the other. The addition of a negatively charged solution, such as latex, to a positively charged oil in water emulsion, sufficiently frothed, and containing coagulating ions in the form of suspensoid precipitates, causes thickening, and eventual coagulation, the reaction taking place as the latex meets the randomly placed coagulation ions. Overly energetic coagulation of the negative latex dispersion may be prevented by the addition of a small amount of soap in the positively charged emulsion.

To more clearly set forth the practice in accordance with this invention and to more specifically point out the nature of the composition contemplated thereby, several specific, illustrative examples are hereinafter set forth, it being understood that these examples illustrate several embodiments which have given satisfactory results and are not intended to restrict the invention thereto. The proportions are in parts by weight unless otherwise indicated.

In the following examples the various types of gelatin are used which may be identified as follows:

| Grade | Composition | Viscosity (bloom) | Bloom gel strength | pH | Isoelectric |
|---|---|---|---|---|---|
| UCopCo 4X | {25% alkaline ossein. 75% acid porkskin.} | 30 | 125 | 4.6 | {25% 4.7 75% 7.5–8.0} |
| UCopCo 8X | Alkaline ossein | 46 | 200 | 6.4 | 4.7 |
| UCopCo 10X | Alkaline ossein | 44 | 230 | 6.9–7.2 | 4.7 |
| UCop Co 10X | Acid porkskin | 43 | 235 | 4.5 | 7.5–8.0 |

In using the expression "gelatin chloride," the gelatin is identified as that produced by acid hydrolysis with hydrochloric acid. "Calcium gelatinate" is that grade of gelatin ensuing from the alkali hydrolysis of limed collagen. Above the isoelectric points the gelatins are assumed to be negatively charged and below, positively charged. The charge in either case is assumed to be positive or negative in character, depending on the hydrogen ion concentration of the system and may be reversed or modified by electrolytes or other extraneous material which modify the pH of the system with reference to the isoelectric point of the gelatin.

As examples of aerated oil in water emulsions or oil stabilized foams, positively charged to or else containing ionic substances antagonistically acting on the latex system, the following are submitted:

|  | A | B |
|---|---|---|
| Gelatin (UCopCo 4X) | 65.00 | 65.00 |
| Glycerol | 10.00 | 10.00 |
| Ferrous sulfate | 5.00 | 5.00 |
| 50° Bx sodium hydroxide |  | 8.00 |
| Oleic acid |  | 5.00 |
| Sodium silico fluoride | 10.00 | 10.00 |
| Light mineral oil | 100.00 | 100.00 |
| Water | 797.00 | 797.00 |
|  | 987.00 | 1000.00 |

Blending in a latex composition consisting of 1420 parts of 70% concentrated latex containing 2½% soap and 1% stabilizer and admixed with 160 parts of a vulcanizing mixture consisting of 10 parts sulfur, 30 parts zinc oxide, 10 parts of an antioxidant, such as agerite white, and 10 parts of an accelerator such as zinc dibutyl dithiocarbonate dispersed in water, resulted characteristically. Froth "A" being highly loaded with ionic materials not suitably "buffered," coagulated or else thickened excessively when attempting to blend the latex composition. On the other hand, "B" froth resulted in uniform blending with slow even increase in viscosity, eventually gelling within a short interval.

In preparing these emulsions, the gelatin in 40% solution is diluted with hot water at 75°–80° C., the ferrous sulfate, in hot water solution, added, slowly stirred for two or three minutes and the glycerol, also suitably diluted in hot water added. Thereon the caustic liquor oleic acid mixture, in the form of excess alkali-sodium oleate mixture diluted with hot water is now added. Instant reaction occurs and the mixture now changes from an amber liquid to a bright blue-green fluid. Thereupon the electrolytic salt sodium silico fluoride suspended in a suitable amount of water is added and the material is now violently agitated or whipped while slowly pouring in the oil. The color of the mixture gradually lightens to a white or cream tint and in a few minutes the froth is whipped to the desired volume.

The precise volume of water added to each ingredient is immaterial, provided the total amount is not exceeded and sufficient fluidity exists. Whipping to the desired volume increase, say from 250% to 500%, is best carried out in a jacketed vessel having a suitable rotary whisk or whip. Temperatures are preferably maintained at 55°–60° C. and cooling is initiated when the color lightens and the viscosity again increases.

The following latex compositions, having a total solid content of 60%, are suitable for blending with the above types of emulsion:

|  | A | B |
|---|---|---|
| 60% latex as solids | 1000 | 1500 |
| Zinc oxide | 30 | 45 |
| Sulfur | 10 | 30 |
| Accelerator (ethyl zimate) | 10 | 15 |
| Antioxidant | 10 | 30 |
|  | 1060 | 1620 |

Admixing with the froth is accomplished by slowly pouring in the latex whilst slowly agitating the froth. After 1 minute, the operation is completed and the resulting mass is poured into molds, permitted to gel, and then suitably vulcanized, avoiding excess temperatures. Ordinarily, a curing range of from 195° to 205° is suitable. The finished product results in cellular sponge having an irregular interconnecting cell structure, the densities varying according to the volume of air incorporated in the froth and is characterized by having heavy walled cells of uneven thickness.

In preparing frothed emulsions of this type, sharp color changes ensue, owing to ionic activity, and the coagulating ions exist as suspensoid precipitates on the emulsion interfaces. It will be noticed that the excess of alkali-sodium oleate is important, otherwise difficulty will be experienced in blending the latex with the emulsion, owing to the possibility of coagulation from active ions on the film interstices of the emulsion.

EXAMPLE II

In the preceding example, the aerated oil in water emulsions, based on the use of an amphoteric colloid such as "Ucopco 4X" gelatin, a mixture of 75% "gelatin chloride" and 25% "calcium gelatin" necessitates somewhat higher proportions of the gelatin emulsifying agent in ratio to the rubber content of the sponge than are considered desirable in many cases. The use in this specification of 70% concentrated latex, containing 2½% soap and stabilizing material, is also occasionally unsuitable for certain grades of cellular rubber-like products owing to the difficulty of completely freeing the interior of the sponge mass from moisture and excessive soapiness.

It is a further object of this invention to utilize the method of producing antagonistically charged emulsions in such manner that the emulsifying agent bears a very low ratio to the rubber content; and furthermore, the use of quick drying latex, free from excessive soap content, can advantageously be permitted. It also is an object of the invention to utilize other chemical agents for modifying the emulsifying colloid, such agents possessing little or no adverse effect on the aging properties of the cellular product. Finally a much stronger cellular structure, produced by changing the type of aerated oil in water emulsion, may be obtained, resulting in considerably smaller and more uniform cell structure in the finished product.

The emulsifying agent selected should preferably be a gelatin having greater bloom and viscosity values. A suitable grade of gelatin is that identified as 8X gelatin, bloom jelly strength 200, bloom viscosity 46 and which, having a pH value of 6.4, is nearly neutral. This gelatin is generally identified as "calcium gelatinate" and has an iso-electric point of 4.7 pH.

In modifying the properties of this gelatin, small amounts of chrome alum are beneficial. Since this material is both a tanning agent and protein precipitant, its formula $$K_2SO_4Cr_2(SO_4)_3.24H_2O$$

permits many reactions to proceed in situ whilst in solution with the calcium gelatinate. Caution, however, should be exercised with its use and in the order of adding other materials as very small amounts are usually sufficient, otherwise there is danger of creating irreversibly gelled material or else premature precipitation with certain electrolytes or buffer agents.

Since the chrome alum contains trivalent radicals, it is advisable to eliminate univalent material such as the oleates, etc., and instead, select a material more inert as a buffer agent. Such an ingredient is one-half sodium sulfate ester of lauric and myristic alcohol, possessing great activity as a foaming, wetting and protective material. Comparatively small amounts are necessary, and when using "calcium gelatinate" one tenth of one percent to two-tenths of one per cent on the rubber is usually sufficient.

As a typical example of an aerated oil in water emulsion based on the use of calcium gelatinate and bearing a ratio of 1.25% gelatin on the rubber, the following compound is illustrated:

|  | Parts by weight |
|---|---|
| 8X gelatin | 12.500 |
| Chrome alum | .125 |
| One half sodium sulfate ester of lauryl and myristyl alcohol | 2.000 |
| Sodium silico fluoride | 40.000 |
| Ammonium carbonate | 12.000 |
| Mineral oil | 100.000 |
| Water | 290.000 |
|  | 456.625 |

In the above example, the dissolved gelatin is treated with 1% chrome alum solution for 35 to 45 minutes at 45°–50° C. and the sodium sulfate ester added at the end of this period. The material is now placed in a suitable frothing apparatus such as a jacketed vessel having a rotary whisk or whipper. Hot water circulating through the jacket maintains temperatures of 40° to 45°. Whipping is vigorously initiated and the oil slowly added while frothing begins. At the end of the oil addition, the whipping continues until a twenty-fold increase in volume occurs. Thereupon the sodium silico fluoride is added and a prompt reaction becomes visibly apparent. No color change is observable, but the previously smooth foam is now of uneven composition, as the reaction results in the formation of white precipitated material suspended on the film membranes of the emulsion. Addition of ammonium carbonate in solution gradually smoothens the uneven textured foam and eventually the desired increase in volume is obtained.

A suitable latex composition containing 58% solid matter for blending into this froth, is as follows:

| | |
|---|---|
| 60% centrifuged latex solids | 1000 |
| Zinc oxide | 50 |
| Sulfur | 27.5 |
| Accelerator | 10 |
| Antioxidant | 20 |
| | 1107.5 |

Slowly pouring this latex into the aerated oil in water emulsion and stirring for 3 to 4 minutes results in the production of a very smooth, evenly mixed product of extremely small cell structure.

Unloading into molds and suitably vulcanizing, avoiding excess temperatures, results in the production of extremely small-pored cellular sponge. Densities of .069 to .085, according to air content of the emulsion, ensue, according to the volume of air incorporated in the emulsion.

It is obvious other modifications are available, in some instances reducing the gelatin to 0.6% or lower, on the rubber content.

EXAMPLE III

In the accompanying examples, the aerated oil in water emulsions have as the emulsifying agent an amphoteric colloid chemically modified by either a ferrous or other salt of the -ic and -ous type of the iron group of the periodic scale or else the modifying agent is one of a group of tanning agents such as chrome alum for example. Positively charged ions were formed by the interaction of an electrolytic salt such as an alkali silico fluoride or other reagent with excess alkali such as ammonia or sodium hydroxide in the presence of ferrous complexes or chrome alum and the gelatin.

I have found that if a suitable grade of gelatin be used, such as "Ucopco 4X" gelatin, a mixture of 75% "gelatin chloride" and 25% "calcium gelatinate" or else if "gelatin chloride" "Ucopco 10X" gelatin is used, it is unnecessary to chemically modify the emulsion with alkali silico fluorides or similar electrolytic material.

It is also a further object of this invention to use those ions which are created in situ through thermal dissociation and whose existence does not materially destroy the foam forming properties of the emulsion, either prior to or after their creation. They may or may not be active at ordinary temperature. Usually, the selection of such ion forming material may be from those reagents whose solid particles are strongly film reinforcing to the membrane interstices when placed in the emulsion. Typical compounds are zinc oxide, magnesium oxide or those difficultly soluble or hydrolysable substances which do not have an antagonistic action on the foaming properties of the emulsion.

In certain cases, these solid film reinforcers can be omitted. If an easily dissociable salt such as ammonium carbonate or ammonium bicarbonate is used, the foam is much more reactive under thermally favorable conditions. It is advisable, however, to use a suitable surface tension depressant, preferably one whose physical properties assist in the formation of good foam. Such a surface tension reducer or wetting agent is the one-half sodium sulfate ester of a mixture of lauryl and myristyl alcohols. Only small amounts need be used, usually $\frac{1}{10}$ of 1%, and in some instances $\frac{1}{5}$ of 1% on the latex rubber content is sufficient.

If the gelatin is subject to treatment with ferrous sulfate, it will be found that an aerated oil in water emulsion can be produced having as its constituent ionic material, those ions formed by the reaction of the protein and the ferrous complexes with ammonia and carbon dioxide from the hydrolysis of ammonium carbonate.

A typical example of an aerated oil in water emulsion utilizing hydrolyzed gelatin, ferrous sulfate and ammonium carbonate, is as follows:

| | |
|---|---|
| 4 X gelatin | 6.00 |
| Ferrous sulfate | 1.20 |
| Glycerol | 1.56 |
| One half sodium sulfate ester of lauryl and myristyl alcohol | 1.00 |
| Ammonium carbonate | 12.00 |
| Mineral oil | 100.00 |
| Water | 229.00 |
| | 350.76 |

The gelatin is treated with ferrous sulfate in the usual manner, the glycerol and the sodium sulfate ester added, and whipping or whisking in a suitable apparatus initiated. The oil is slowly added and finally the ammonium carbonate in a few parts of water is added. A volume increase up to 30 fold is obtainable and a fragile, fluffy frothed emulsion is created. The usual latex addition to the emulsion is now made, using the 60% centrifuged type, 1626 parts by weight contain 170 parts of the vulcanizing ingredient specified in example.

Poured into molds and suitably vulcanized results in a light, thin walled interconnecting cellular product.

EXAMPLE IV

The above example, while satisfactory for certain utility, is nevertheless rather fragile and it has been found the modifications created by the following specification result in easier manipulation. In this case, the ferrous sulfate is omitted and zinc oxide used:

| | |
|---|---|
| 4 X gelatin | 6.00 |
| Glycerol | 6.00 |
| One half sodium sulfate ester of lauryl and myristyl alcohol | 2.00 |
| Colloidal zinc oxide | 20.00 |
| Ammonium carbonate | 50.00 |
| Mineral oil | 100.00 |
| Water | 229.00 |
| | 363.00 |

In the above formula, the frothed and aerated oil in water emulsion has as its characteristic ingredient substantial amounts of zinc oxide evenly distributed on the film membranes of the air-water-oil interfaces. The metallic oxide is peculiarly susceptible to the formation of ionic complexes with ammonia and, in addition, substantial amounts of carbon dioxide are entrapt in the froth structure. Blending with the same type of latex composition as illustrated above results in slight thickening; and after thoroughly admixing, the mixture is unloaded into suitable molds and vulcanized. A tough, strong, cellular product, characterized by a multitude of small pores interconnected by filamentary nuclei, results.

It is possible to obtain much quicker reacting ionic material by using the ammonium salt of a strong acid in conjunction with the zinc oxide film reinforcer and the ammonium carbonate. It usually ensues, however, that the use of the ammonium salt of a strong acid will rapidly destroy or render valueless the foaming properties of an aerated water emulsion. The nitrate salt is peculiarly destructive in this respect. In order to overcome this ionic activity, the inclusion of inorganic colloidal matter such as bentonite clay materially assists in overcoming the foam destroying properties of ammonium salt radicals. In addition, bentonite and gelatin mutually react on each other to some extent as antagonistic electrolytes in the foam. It has been found that the addition of a 10% aqueous suspension of bentonite to suitably dissolve "calcium gelatinate" permits quick blending of the latex composition which, if promptly poured in molds and thence immediately subjected to correct vulcanization procedures, results in excellent cellular products.

EXAMPLE V

As a typical example of an aerated oil in water emulsion, containing as its constituent parts a calcium gelatinate emulsifier, a wetting agent and an inorganic colloidal material for resisting overly energetic acid radicals, the following example is illustrated:

| | |
|---|---|
| 8 X gelatin | 6.00 |
| Bentonite | 10.00 |
| One half sodium sulfate ester of lauryl and myristyl alcohol | 2.00 |
| Colloidal zinc oxide | 50.00 |
| Ammonium carbonate | 15.00 |
| Ammonium nitrate | 25.00 |
| Mineral oil | 100.00 |
| Water | 400.00 |
| | 608.00 |

In the above example, the gelatin, suitably dissolved, is mixed with a 10% bentonite solution, the one-half sodium sulfate ester added and the mixture placed in the frothing vessel. Vigorous agitation is begun and the zinc oxide in the form of a 50% aqueous suspension added. Thereupon the oil is slowly added to the frothing mass and the ammonium carbonate, in a few parts of water, now added. When the frothing mixture reaches some twenty to twenty-five-fold increase, the electrolytic nitrate salt is added and stirring continues for a few moments, resulting in an even, smooth textured foam of extremely small bubble size.

After addition of the same latex composition illustrated in the preceding examples, the material is promptly unloaded into molds and transferred as rapidly as possible to the vulcanizing apparatus. After suitably vulcanizing under correct temperatures, the resultant product emerges as a uniform cellular product.

In an example of this type, it is inadvisable to delay placing the material under heat any longer than advisable. Ammonium salt radicals of this type slowly result in a viscosity decrease, eventually permitting levitation of the bubbles and the formation of a bottom skin on the product unless the molds are immediately subjected to heat.

As a general rule, it is inadvisable to add zinc oxide to acid gelatins or alkali gelatinates containing ferrous sulfate in appreciable quantities — precipitation usually occurs and the emulsion becomes of little value for practical purposes.

It is obvious that other gelling materials or those ingredients capable of dissociating into antagonistic ions will be suitable.

As examples illustrating the possible influence of amphoteric emulsifiers as governing the reaction in accordance with the isoelectric point of the gelatin, the reaction is examined from the relationship of hydrogen ion concentration and influence of added material affecting this hydrogen ion value of the emulsion. Whether or not the reaction cam be described as an adsorption complex, salt reaction as described by Loeb or due to complete or partial precipitation of two oppositely charged colloidal ingredients in the foam structure is immaterial. Suffice to state the reaction proceeds in such manner to result in the desired method of controlling the ionic or charge effect in both the foamed emulsion and latex. Using 10X acid gelatin and 10X alkaline gelatin as comparing the influence of electrolytes on the froth membranes, the following illustrate the procedure:

|  | Acid gelatin A | Alkaline gelatin B |
|---|---|---|
| 10X gelatin | 12.50 | 12.50 |
| Tannic acid | .75 | .75 |
| CP Ammonium hydroxide | 6.43 | 6.43 |
| Aquarex D | 1.10 | 1.10 |
| Sodium silico fluoride | 20.00 | 20.00 |
| Water | 301.00 | 301.00 |

The "A" reaction resulted in the formation of flocculates which gradually subsided to occupy about one-third of the bulk volume. "B" resulted in comparatively unchanged fluosilicate, the salt existing in a sedimentary state on the bottom, the gelatin being comparatively unaffected. In describing this phenomena, recourse is taken to the effect of anion and cation adsorption on gelatins of two different isoelectric points. Gelatin is assumed to be an amphoteric colloid which may carry on its surface an electric charge depending on its isoelectric point. 10X acid gelatin, derived from acid hydrolysis of non-limed precursors is believed to have an isoelectric point of 7.5 to 8.00 and pH value of 4.7. 10X alkaline gelatin produced from limed collagenous material is assumed to have isoelectric point of 4.7 and pH value of 6.9 to 7.2. Accordingly it is considered the gelatin will carry its initial charge unless changed or reversed by electrolytes or other components of the froth. If so the gelatin 10X acid could be described as being positively charged below 7.5 whilst 10X alkaline gelatin is negatively charged above 4.7 pH. "A" mixture results in pH value of 4.8 far below the theoretical isoelectric point. "B" mixture results in pH value of 5.0 which was not sufficient to permit the theoretical cation influence on the gelatin. It is characteristic of positively charged gelatin to exist in form of so-called mutually attracted particles or flocs. Oil addition, say 100 parts to the above composition, then gives the typical reaction showing the presence or absence of precipitated materials on the foams, which seem to be without effect so far as foaming propensities are concerned.

If the sodium silico fluoride is the so-called technical or commercial grade, traces of iron are present. In the presence of tannic acid, a characteristic color reaction is created and this affords further indication of the phenomena.

The range of color may be said to exist as follows: ←Clear→3.5 pH←violet→5.5 pH←light brown→ pH←Dark brown. This range can be approximated by taking small samples of the above solution "A" and testing with either dilute ammonium hydroxide or sulfuric acid. At 5.5 pH a very bright tint is observable and a uniform gel condition is observable in the mixture.

In order to eliminate gelatin from the reaction and to consider how these positively charged ions are created, the following example is submitted:

| | |
|---|---|
| Aquarex D | 1.25 |
| C. P. tannic acid | .75 |
| C. P. ammonium hydroxide | 5.00 |
| Tech. sodium silico fluoride | 20.00 |
| Water | 138.00 |

This mixture rapidly evidenced increasing reaction, a color change, deep blue violet occurred on the interface, between decomposing fluosilicate and liquid. The reaction eventually culminated into a loosely cohesive silica gel formation characterized after stirring by the multitude of bluish purple particles uniformly scattered through the mass.

Eliminating the influencing of sodium silico fluoride as an "ion-producer" in the froth, the influence of 28% hydrofluosilicic acid is next illustrated as producing antagonistically charged ions aerated in an oil in water emulsion:

|  | A | B | C | D |
|---|---|---|---|---|
| 10X acid gelatin | 12.5 | 12.5 | 12.5 | 12.5 |
| Tannic acid | .75 | .75 | .75 | .75 |
| Ammonium carbonate | | 12.5 | 6.0 | 4.0 |
| 20% hydrofluosilicic acid | 55.0 | 27.5 | 27.5 | 27.5 |
| Aquarex D | 1.1 | 1.1 | 1.1 | 1.1 |
| Oil | 100.00 | 100.0 | 100.0 | 100.0 |
| Water | 274.15 | 286.65 | 294.15 | 286.65 |

Following the usual procedure of forming the flocculate complex of tannic acid and ammonium carbonate and adding this to the diluted gelatin solution, then Aquarex D and finally the successive additions in the frothing vessel of oil and hydrofluosilicic acid while whipping result in the desired physical characteristics of stable, highly charged foams.

Blending a commercial 60% latex into the usual vulcanizing dispersion, 827 parts of latex and 80 pH of vulcanizing compound, results as would be predicted. Compound "A" having a pH of 3.5 resulted in immediate coagulation in the bowl and further procedure was useless. At pH 3.5 the gelatin is stated to be positively charged. In order to render the composition more tractable with the latex composition, a "buffer" (ammonium carbonate) which acts to increase hydroxyl ion concentration is added. The effect is witnessed in froths B, C and D, resulting in very smooth and even blending. High concentrations of this "buffer" such as in B. give a pH of about 7.0 and consequently, less speed in gelling. With increasing hydrogen ion concentration at pH 4.5 and 4.2 for C and D froths, respectively, better control of the jelling phenomena occurred.

Any partial precipitation of the gelatin resulting from adding the tannic acid-ammonium carbonate complex is ignored and left in the mixture. Continued frothing apparently seems to shear down the size of these precipitates.

As examples showing the influence of other than artificially created colloidal gelatinous material in the membrane interstices of the froths, the action of an additive compound such as triethanolamine acetate or formate is now considered. Contrasted to previous formation of electrolytes ensuing from salt decomposition or formation from acidic radicals in presence of alkaline carbonates, these compounds contain soluble material which react somewhat differently in behavior. These ions can be said to be concentrated in the interfaces, according to literature relative to this phenomena, and may be said to roughly conform to Gouys' Illustration of a diffuse double layer (Compt. rend. 149 654 1909). Irrespective of what theory is involved in interpreting the Helmholtz effect or its modifications, the fact remains that in the behavior of these froths, the ionic substances appreciably obey certain definite procedures, that is to say, the compounded frothed emulsion contains material active against latex systems and yet comparatively inert so far as any deleterious effect on the foams own stability is concerned. 10X alkaline gelatin having an apparent isoelectric point of 4.7 is selected:

| | |
|---|---|
| 10X alkaline gelatin | 12.50 |
| Aquarex D | 1.10 |
| Triethanolamine | 30.00 |
| Glacial acetic acid | 12.00 |
| Ammonium carbonate | 12.00 |
| Light mineral oil | 100.00 |
| Water | 301.50 |

125 parts of a 10% 10X alkaline gelatin was added to 115 parts of water, heated to 45°–50° C. and 11 parts of a 10% Aquarex D solution added and the mixture placed in the bowl. Whipping proceeded while adding oil and then the triethanolamine and acetic acid, mixed and permitted to foam the additive complex in 20 pts. of water were next added. Finally the ammonium carbonate suspension in the remaining water was added last. Prior to the carbonate addition a pH of 5.4 existed, the "buffer" action of the ammonium salt resulting in a final pH of 7.5 in the completed aerated oil in water emulsion. Placed in oven at 70° for 30 minutes and finally cooked 1 hour at 95° C., then blended with 833 parts of 60% latex having added to it the usual 80 parts of the vulcanizing dispersion, resulted in a cellular product suitable for certain utility application.

EXAMPLE VI

In the examples previously submitted, it has been shown that gelatins, either "gelatin chlorid," "calcium gelatinate" or mixtures thereof, are suitable for use as emulsifying agents, particularly when it is desired to form or create ionic material on or in the gelatin film or membrane.

I find also that the use of other emulsifying agents less sensitive to electrolytic material, and which are enabled to form aerated oil in water emulsions, particularly in the presence of such material as diphenyl guanadine, ordinarily destructive to most froth-forming material, is practical and easily utilized.

In the examples herein following, locust bean gum is selected as exemplary. While not ordinarily used as an emulsifying agent, owing to its high viscosity, I find that in conjunction with a suitable surface tension depressant such as the one-half sodium sulfate ester of lauryl and myristyl alcohol, it functions excellently when used with many materials possessing adverse effects on amphoteric emulsifiers such as gelatin. While its viscosity is more or less affected by alkaline material, nevertheless, it functions well in the presence of such material as ammonium carbonate and also diphenylguanadine, etc.

As a typical example of locust bean gum used in connection with substantial amounts of zinc oxide and ammonium carbonate, the following example is illustrated:

| | |
|---|---|
| Locust bean gum | 15.00 |
| One-half sodium sulfate ester of lauryl and myristyl alcohol | 7.50 |
| Ammonium carbonate | 35.00 |
| Zinc oxide (colloidally dispersed) | 62.50 |
| Mineral oil | 250.00 |
| Water | 885.00 |
| | 1225.50 |

The procedure employed in producing this froth differs somewhat from former methods. The locust bean, in a 3% solution, is diluted and made homogeneous with warm water, then the sodium sulfate ester is added, followed by the zinc oxide in the form of a 50% suspension and then the ammonium carbonate in the balance of the water. The oil is also included and the entire mixture is placed in a vessel equipped with a rotary whip as heretofore practiced. A rapidly and fairly quick rise to the desired volume is obtained within a very few minutes.

Extreme care must be used to obtain a thoroughly uniform suspension of the gum, otherwise a somewhat localized "soapy condition" will ensue or else irregular cellularity occurs.

Thereupon the following latex composition, having a solid content of 52%, is added to the aerated emulsion:

| | |
|---|---|
| Rubber (70% evaporated latex type) solids | 1000 |
| Zinc oxide | 30 |
| Sulfur | 10 |
| Accelerator | 10 |
| Antioxidant | 10 |
| | 1060 |

The material blends easily into the froth and it is necessary to quickly unload into molds in order to avoid premature thickening of the mixture. After suitably vulcanizing, a completely homogeneous cellular product results. Control of the gelling rate may be obtained by adjusting the amount of the sodium sulfate ester.

EXAMPLE VII

The use of another highly reactive material such as diphenylguanidine can be illustrated. In the following example, the locust bean is reduced to a minimum and a substantial amount of a film extender such as glycerol is used. This film extender assists in both partially dissolving and suspending appreciable amounts of zinc oxide:

| | Parts by weight |
|---|---|
| Locust bean | 1.80 |
| One-half sodium sulfate ester of myristyl and lauryl alcohol | 5.00 |
| Glycerol | 21.00 |
| Zinc oxide (colloidally dispersed) | 10.80 |
| Diphenylguanidine | 4.00 |
| Mineral oil | 64.80 |
| Water | 248.00 |
| | 356.00 |

The procedure is essentially as in the previous example except that it is necessary to add the diphenylguanidine in the form of a 25% suspension in an aqueous vehicle consisting of a 2% solution of the sodium sulfate ester.

Using 60% centrifuged latex as a base, a latex composition consisting of 1666 parts of latex and 160 parts of the usual mixture of vulcanizing ingredients, the composition is slowly poured into the rather fluffy and fragile froth. Thoroughly mixing and unloading in suitable molds results, after vulcanizing, in a light cellular product. It is necessary to employ a slowly rising temperature not exceeding 195° F. for at least 45 minutes prior to curing the product by accepted technique such as in hot water or in pressure vulcanizers, to avoid excessive irregularity in the cellular structure.

Control of the desired gelling rate is obtained by adjusting the amounts of zinc oxide or diphenylguanidine. Omitting the locust bean from the film membrane results in a practically useless product, owing to excessive thinning and viscosity loss. Omitting the diphenylguanidine results in a loss of gelling activity.

The use of locust bean as the film foundation results in nicety of control of gelling activity when the one-half sodium sulfate ester is properly balanced. As a general rule, the amount of ester used should seldom fall below 40% of the locust bean content in many types of froths, otherwise coagulation will nearly always ensue if this precaution is neglected.

EXAMPLE VIII

The possible use of an aerated oil in water emulsion as a most powerful catalyst of electrolytic salts may be easily illustrated with locust bean froths utilizing the smaller amounts of the sodium sulfate ester and considerably greater proportions of oil in the emulsion. The action of the emulsifying agent as an added factor is shown by the use of larger amounts. Increasing the proportion of oil interfaces in the emulsion membrane profoundly alters the character of the reaction, if sufficiently high, say for instance 25 to 27% on the rubber content, and with extremely small amounts of electrolytic agents such as sodium silico fluoride in amounts as low as ½ of 1% on the rubber, invariably result in coagulation. In many instances, the action is accelerated by dissolving the sodium sulfate ester in glycerol prior to incorporation in the emulsion. If the emulsifying agent is materially over 1½ to 1¾% of the rubber content, extremely sharp gelling if not premature coagulation occurs and the emulsion is capable of acting catalytically.

As typical examples of extremely overcharged aerated oil in water emulsions possessing energetic activity on the latex system, the following is submitted:

| | Parts by weight | | |
|---|---|---|---|
| | A | B | C |
| Locust bean gum | 1.578 | 1.578 | 1.578 |
| One-half sodium sulfate ester of lauryl and myristyl alcohol | .425 | .425 | .425 |
| Glycerol | 1.578 | 1.578 | 1.578 |
| Sodium silico fluoride | 3.000 | 1.500 | .600 |
| Mineral oil | 15.780 | 15.780 | 15.780 |
| Water | 127.923 | 127.923 | 127.923 |
| | 150.284 | 148.784 | 147.884 |

The sodium sulfate ester is preferably dissolved in the glycerol, though this manner of adding it to the emulsion is not an absolutely rigid requisite, added to the gum solution which is dissolved in 103.683 parts of water. Whipping or whisking is then initiated, the oil slowly added and the electrolyte salt added in the balance of the water. Aeration is continued until the desired volume increase is attained, according to the theoretical density sought in the finished product.

A latex composition, using 70% evaporated type of concentrated latex, containing the usual amounts of soap and caustic potash, is mixed with the usual vulcanizing ingredients in aqueous suspension. The composition having a solid content of approximately 58% is as follows:

| | Parts by weight |
|---|---|
| Rubber | 54.348 |
| Zinc oxide | 1.630 |
| Sulfur | .543 |
| Accelerator | .543 |
| Antioxidant | 1.080 |
| | 58.114 |

Coagulation invariably ensues when attempt is made to blend the above latex composition or else thickening progresses to such extent that further processing is impractical. The comparatively high oil content and emulsifying agents act as efficient catalyzers of the smallest amount of electrolytic material, provided the sodium sulfate buffer is kept sufficiently low.

EXAMPLE IX

As examples of the aerated oil in water emulsions showing how the decrease or increase in action of the positively charged ionic material on the emulsion interstices is controllable, the following examples are submitted:

| | A | B | C |
|---|---|---|---|
| Locust bean gum | 1.052 | 1.776 | 1.776 |
| One-half sodium sulfate ester of lauryl and myristyl alcohol | 1.052 | 1.050 | .800 |
| Sodium silico fluoride | 5.250 | 4.000 | 4.000 |
| Mineral oil | 37.500 | 26.782 | 26.782 |
| Water | 94.744 | 79.694 | 79.694 |
| Glycerol | 1.050 | | |
| Total | 140.650 | 113.302 | 113.052 |

Compound A is comparatively easy in manipulation when blending in 2150 parts of 70% latex and 215 parts of the usual vulcanizing ingredients. On the other hand, compounds B and C are far faster in gelling speed, C dangerously so, as a solid gel after admixing the latex usually occurs within 8 or 9 minutes. The latex compositions for the latter compounds consist of 100 parts of latex solids plus nine parts of a vulcanizing mixture.

Decreasing the sodium sulfate ester and increasing the electrolytic usually results in nearly instantaneous coagulation when blending in the mixing vessel.

In using 60% concentrated latex, the usual centrifugal type, a slightly different procedure is necessary. In the following examples, both an extremely active emulsion and one in which the positively charged ions are susceptible of manipulation, are shown:

|  | A | B |
|---|---|---|
| Locust bean gum | .875 | .875 |
| One-half sodium sulfate ester of lauryl and myristyl alcohol | .350 | .500 |
| Sodium silico fluoride | 5.000 | 4.000 |
| Mineral oil | 26.782 | 26.782 |
| Water | 67.843 | 67.843 |
|  | 98.850 | 100.200 |

In this case, the latex composition consists of 166 parts of 60% latex and 12 parts of the usual vulcanizing ingredients. Compound "A" is an extremely rapid gelling mixture, dangerously so, whilst "B" gels in 8 minutes. Increasing the buffer to .875 parts and decreasing the electrolytic salt, leads towards non-gelling material.

EXAMPLE X

The albumen used in this example is the "Birch brand" spray dried soluble blood of Wilson & Co. It may be described as defibrinated blood albumen and behaves similarly to hemoglobin, i. e., it gels with formaldehyde, coagulates under influence of heat and generally illustrates the behavior characteristic of this protein group.

In emulsions its behavior differs from gelatins or other soluble emulsifying agents in that it will undergo, under the influence of agitation in forming foams, transformation from a completely dissolved substance to one characterized by the existence on the membrane of some "de-solubed" particles, as well as some amounts of coagulated and insoluble particles. This is further accelerated by treatment first with ammonia then with formaldehyde which renders these membranes insoluble and inert against the majority of electrolytes used as gelling agents in the reaction. A further characteristic is its behavior when adding diphenyl guanadine or calcium sulfate to it. These reagents, extremely destructive to ordinary soaps or soluble protein films, are comparatively without effect on its emulsion or froth stability under conditions explained below.

|  | A | B |
|---|---|---|
| Blood albumen | 20 | 13 |
| Aquarex D | 2 | 20 |
| C. P. ammonium hydroxide | 15 | 15 |
| 40% formaldehyde solution | 8 | 15 |
| Sodium silico fluoride | 20 | |
| Calcium sulfate | | 5 |
| Diphenyl guanidine | | 1 |
| Ligher mineral oil | 100 | 100 |
| Water | 370 | 370 |
|  | 535 | 528 |

Basic procedure employed in froths consisted of dissolving 20 pts. of blood albumen in 250 pts. of water, adding the Aquarex D in 100 pts. of water, next the ammonia and placing in the bowl. In "A" the remaining procedure consisted of adding oil, frothing and adding formaldehyde immediately after the silico fluoride salt. Prior to the silico fluoride addition, the foam was very fragile and fluffy and the foaming reaction resulted in a very firm and stable froth. With "B" emulsion, the formaldehyde was added prior to the alkaline sulfate and diphenyl guanidine.

Addition of 833 pts. of 60% centrifugal latex containing 85 pts. of the usual vulcanizing dispersions proved uneventful in both instances. Unloading into open shallow trays and suitably vulcanizing resulted in the desired product.

The mixture formed by adding the latex composition to "A," aerated emulsion, after standing a few moments resulted in a pasty, pulpy, loosely cohesive mass not resembling the usual gel reaction. Subjection to the usual heat treatment at 60° to 95° C. resulted in cohesive gelling. "B" mixture heated, coagulated at 75° to 95° C. and resulted in the characteristic reaction of heat reactive salts on the system.

It is obvious that other modifications such as albumen-zinc oxide mixtures in conjunction with ammonium hydroxide or carbonates and organic fatty acid soaps and/or surface tension depressants are utilizable.

EXAMPLE XI

As example of creating positively charged emulsions without recourse to chemical reaction of salts, acids or decomposition of slightly soluble salts, advantage is taken of the properties of so-called cationic soaps which causes positive charges in an aqueous media, irrespective of pH value. As an example of this a long chain quaternary ammonium compound consisting of a long chain positive ion and a negative consisting of either a halide, sulfate or other annionic group, the following is submitted. It is understood that the gelatin is positively charged, i. e., 10X acid gelatin.

|  | Parts |
|---|---|
| 10X acid gelatin | 5.00 |
| 20% solution of lauryl trimethyl ammonium bromide | 10.00 |
| Oil | 100.00 |
| Water | 300.00 |

The usual procedure in blending is employed with a latex mixture consisting of a mixture of 837 parts latex and 80 parts of the usual vulcanizing mixture. The material gelled solidly at 70° C. Increasing the cationic soap brings increasing instability, finally resulting in gelling at room temperature if the cationic soap is sufficiently high.

Other typical cationic soaps conferring positive charges are stearyl trimethyl ammonium bromide, cetyl pyridinium bromide, and others of this type.

EXAMPLE XII

*Other emulsifying agents*

Finely divided solids are known to act as flotation reagents and foam stabilizers. In addition, under certain conditions they function somewhat more or less effectively as emulsifying agents. While not themselves affected by chemical reaction in suitable media for foaming, they nevertheless apparently conform to certain basic laws governing the electrolytic behavior of emulsions.

As typical examples of solid matter acting as combined emulsifying agents and foam stabilizers in presence of a surface tension depressant, bentonite (a colloidal clay) and dispersed carbon black are shown in the following:

|  | A | B |
|---|---|---|
| Bentonite | 4.51 | |
| Carbon black | | 9.047 |
| Darvan | | .180 |
| Aquarex D | 2 | 3 |
| Sodium silico fluoride | 40 | 40 |
| Ammonium carbonate | 12 | 12 |
| Oil | 100 | 100 |
| Water | 301.5 | 301.5 |
|  | 460.01 | 465.727 |

The bentonite was suspended in 211.5 pts. of water and 20 pts. of a 10% Aquarex D solution added, and thence mixture placed in the whipping or frothing mechanism. After agitating with the coil, a 50% dispersion of sodium silico fluoride was added, followed immediately by the carbonate in the balance of the water. Frothing was sharply arrested after the silicate salt addition but the usual action of ammonium carbonate followed, the pH was raised and foaming proceeded as usual.

With carbon black, somewhat different procedure was adopted. Darvan, a dispersing agent for pigments or fillers in aqueous vehicle, believed to originate from the reaction between formaldehyde and a naphthalene sulfonic acid, is effective in wetting pigments and apparently has little effect on the surface tension of the vehicle. This was added to 221.5 pts. of water and a little of this solution gradually added at a time, after manipulation to assure adsorption and homogenity, to dry carbon black. The remaining materials were added as in the previous example, the sodium silico fluoride being dispersed in 40 pts. of water and in the carbonate in the balance.

Heat gelling, i. e. coagulation by immersing in hot water, after blending with a mixture of 1666 pts. of 60% of latex and 170 pts. of the usual vulcanizing dispersion, resulted excellently after curing in hot water of the desired products.

The following examples illustrate the use of other water insoluble foam stabilizers than mineral oil.

EXAMPLE XIII

*Mineral oil replaced by ethyl phthalyl butylglycollate*

| | Parts by weight |
|---|---|
| Gelatin (10X U. Cop. Co. acid type) | 12.5 |
| Tannic acid | .75 |
| $Na_2SiF_6$ | 20 |
| $(NH_4)_2CO_3$ | 12 |
| Aquarex D | 1.1 |
| Santicizer B-16 (ethyl phthalyl butyl glycollate) | 100 |
| Water | 701 |
| Latex (Heveatex 60%) | 8.33 |
| Vulcanizing ingredients | 100 |

An aqueous solution of gelatin and Aquarex D was made at 50° C., tannic acid added and the mixture whipped. The "Santicizer B-16" was then added, together with the sodium silico fluoride and ammonium carbonate. Latex was then intermixed with the aerated oil in water type emulsion so formed and blended perfectly. The mixture was poured into molds, heated in an oven for one-half hour at 80° C. and cured one and one-half hours at 95° C. A good sponge was obtained.

EXAMPLE XIV

*Mineral oil replaced by clay*

| | Weight in grams |
|---|---|
| Clay | 20 |
| Aquarex D (10%) | 11 |
| Triethanol amine | 30 |
| Acetic acid | 13 |
| Water (total) | 301.5 |
| Latex (Heveatex 60%) | 833 |
| Vulcanizing ingredients | 80 |

Procedure: The clay was suspended in the water and Aquarex mixture, and the mixture of triethanol amine and acetic acid added, and whipping continued to 8000 c.c. On blending the latex the volume remained the same. The mold was placed immediately in the tank, heat gelling taking place at once (70° C). The temperature was raised to 95° C. and sample cured 1 hr. This produced a sample of rather coarse cells, but nevertheless satisfactory sponge.

It is to be understood that the process of this invention is not limited to the use of gasified oil in water type emulsions or foams stabilized with droplets of water insoluble liquids. The oil or other water insoluble liquid may be replaced by a suspension of bentonite or gas black, particularly when the gelatin or similar film forming type emulsifying agent is retained. In such cases the particles of the bentonite or gas black may act in some respects like the droplets of oil in stabilizing the froth. I designate such bentonite and gas black froths as suspension type froths, while the oil stabilized froths are designated as emulsion type of froths. The use of bentonite, gas black and similar solid emulsifiers in place of oil or other water insoluble liquids is covered in the present application under the term "water insoluble foam stabilizers."

It is also to be understood that while the gelling agent (generally consisting of ions capable of neutralizing charge on the rubber particle of the latex) is preferably incorporated or produced in the oil in water type emulsion it may be present in the latex which is infiltered into the aerated oil in water type emulsion.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. In the process of preparing cellular rubber from aqueous dispersions of rubber, the step of admixing the aqueous dispersion of rubber with a separately prepared liquid foam comprising bubbles of gas surrounded by water and droplets of oil.

2. In the process of preparing cellular rubber from aqueous dispersions of rubber having an electrical charge which when neutralized causes coagulation or gelation, the step of admixing the aqueous dispersion of rubber with a foam comprising bubbles of gas surrounded by water and droplets of oil, said foam having an effective electrical charge capable of neutralizing the charge of rubber dispersion.

3. In the process of preparing cellular rubber from aqueous dispersions of rubber carrying a negative charge on the rubber particles of the dispersion, the step of admixing the aqueous dispersion of rubber with an oil stabilized foam having an effective positive charge.

4. The method of making a cellular structure of rubber-like material which comprises beating a gas into a composition comprising an emulsifying agent, water and an oil type material to form a stabilized foam, and incorporating an aqueous dispersion of rubber-like material with said foam.

5. The method of making a cellular structure of rubber which comprises beating air into a composition comprising an emulsifying agent, water and an oil to form a stabilized foam, and then infiltering an aqueous dispersion of rubber into and throughout said foam.

6. In the process of preparing cellular rubber or rubber-like products from latex and like dispersions by coagulation of the dispersion in the presence of bubbles of gas distributed therethrough, the step of admixing the dispersion with a separately prepared oil in water type emulsion containing the gas.

7. In the process of preparing cellular rubber or rubber-like products from latex and like dispersion, the step of admixing the dispersion with a separately prepared oil in water type emulsion containing bubbles of a gas, said emulsion including an emulsifying agent.

8. The process set forth in claim 7, in which the emulsifying agent is a protein.

9. The process set forth in claim 7, in which the emulsifying agent is gelatin.

10. The process set forth in claim 7, in which the emulsifying agent is a tanned gelatin.

11. The process set forth in claim 7, in which the emulsifying agent is a colloidal polysaccharose.

12. The process set forth in claim 7, in which the emulsifying agent is locust bean gum, and a wetting agent is present to reduce surface tension.

13. The process set forth in claim 7, in which the emulsifying agent is a finely divided water insoluble solid.

14. The process set forth in claim 7, in which the emulsifying agent is carbon black.

15. In the process of preparing cellular rubber or rubber-like products from latex and like dispersions, the step of admixing the dispersion with a separately prepared oil in water type emulsion containing bubbles of a gas, said emulsion containing an emulsifying agent and a gelling agent for the latex.

16. In the process of preparing cellular rubber or rubber-like products from latex and like dispersions capable of being gelled, the step of admixing the dispersion with a separately prepared oil in water type emulsion containing bubbles of a gas, said emulsion containing a protein emulsifying agent and including a gelling agent as one of its components.

17. In the process of preparing cellular rubber or rubber-like products from latex and like dispersions capable of being gelled, the step of admixing the dispersion with a separately prepared oil in water type emulsion containing bubbles of a gas, said emulsion containing a colloidal polysaccharose as an emulsifying agent and including a gelling agent.

18. In the process of preparing cellular rubber or rubber-like products from latex and like dispersion capable of being gelled, the step of admixing the dispersion with a separately prepared oil in water type emulsion containing bubbles of a gas, said emulsion containing a locust bean gum as an emulsifying agent, and including a gelling agent.

19. In the process of preparing cellular rubber or rubber-like products from latex and like dispersion carrying an electrical charge on the rubber or rubber-like particles of the dispersion, the step of admixing the dispersion with a separately prepared foam comprising an oil in water type emulsion and a regulated and predetermined volume of gas, said emulsion containing ions capable of neutralizing the charge present on the rubber particles of the dispersion.

20. In the process of preparing cellular rubber or rubber-like products from latex and like dispersions having an electrical charge present on the rubber or rubber-like particles of the dispersion, the step of admixing the dispersion with a separately prepared foam comprising an oil in water type of emulsion and a regulated and predetermined volume of gas, said emulsion containing an emulsifying agent and having ions capable of neutralizing the charge present on the rubber particles of the dispersion, the coagulating action produced from said ions being such as to cause incipient coagulation or flocculation without strong gelation, followed by strong gelation after an interval of time such as to permit the flocculated mixture to be poured into molds.

21. In the process of preparing cellular rubber or rubber-like products from latex and like dispersions, the step of admixing the dispersion with a separately prepared foam comprising an oil in water type emulsion and a regulated and predetermined volume of gas, said emulsion containing an emulsifying agent comprising a protein reacted to reduce its protective colloid action, and a delayed action gelling agent such as to cause strong gelation after a time interval such as to permit the mixture to be poured into molds.

22. In the process of preparing cellular rubber or rubber-like products from latex and like dispersion, the step of admixing the dispersion with a separately prepared oil in water type of emulsion containing bubbles of a gas, said emulsion containing an emulsifying agent comprising the reaction product of gelatin with a tanning agent, and a gelling agent for latex which is only slightly soluble in water.

23. The method of making sponge or cellular rubber which comprises beating a gas into a composition comprising water, a water insoluble foam stabilizer and a gelling agent to form a stabilized foam capable of gelling latex, and intermixing latex with said stabilized foam.

24. The process of claim 23 in which a surface tension depressant is used in forming the foam.

25. The method of making sponge or cellular rubber which comprises beating in the presence of gas a composition comprising water, an oil, an emulsifying agent for an oil-in-water type emulsion, and a gelling agent for latex to form a stabilized foam comprising bubbles of gas surrounded by water and droplets of an oil in the gas-water interface, and then infiltering an aqueous dispersion of rubber into and throughout the foam and pouring the mixture into a mold for gelation and vulcanization.

26. The method of making sponge or cellular rubber which comprises beating air into a composition comprising an aqueous dispersion of gelatin, a tanning agent for the gelatin, a gelling agent which is only slightly soluble in water, and oil to form a stabilized foam comprising bubbles of air surrounded by water and droplets of oil in the air-water interface, and then infiltering an aqueous dispersion of rubber containing vulcanizing ingredients into and throughout said foam, allowing the mixture to gel, and heating to vulcanize the rubber and cause the oil to disperse into the rubber.

27. The method of making a cellular rubber or rubber-like product which comprises incorporating a gelling agent, a vulcanizing agent, and a separately prepared foam comprising an oil-in-water emulsion in a rubber dispersion, gelling the dispersion, and vulcanizing.

28. The cellular rubber product obtained in accordance with the process of claim 26.

29. The cellular rubber product obtained in accordance with the process of claim 20, characterized by being a soft product having thick walled interconnected cells.

JOHN H. KELLY, Jr.